(12) United States Patent
Teets et al.

(10) Patent No.: US 7,574,867 B2
(45) Date of Patent: Aug. 18, 2009

(54) HYBRID MICROTURBINE FOR GENERATING ELECTRICITY

(75) Inventors: Joseph Michael Teets, Hobe Sound, FL (US); Jon William Teets, Scottsdale, AZ (US)

(73) Assignee: TMA Power, LLC, Hobe Sound, FL (US)

( * ) Notice: Subject to any disclaimer, the term of this patent is extended or adjusted under 35 U.S.C. 154(b) by 841 days.

(21) Appl. No.: 10/809,719

(22) Filed: Mar. 25, 2004

(65) Prior Publication Data

US 2005/0126182 A1    Jun. 16, 2005

Related U.S. Application Data

(60) Provisional application No. 60/459,861, filed on Apr. 2, 2003.

(51) Int. Cl.
*F02C 3/10* (2006.01)

(52) U.S. Cl. .......................... 60/792; 415/205

(58) Field of Classification Search .................. 60/804, 60/469, 792, 39.17; 415/204, 205, 206, 199.1
See application file for complete search history.

(56) References Cited

U.S. PATENT DOCUMENTS

| | | | |
|---|---|---|---|
| 3,187,188 A | | 6/1965 | Adkins et al. |
| 3,652,139 A | * | 3/1972 | Memery .................... 384/99 |
| 3,942,908 A | * | 3/1976 | Pilarczyk ................ 415/199.2 |
| 4,359,871 A | * | 11/1982 | Strass ....................... 48/127.3 |
| 4,486,147 A | * | 12/1984 | Byrne et al. ............. 416/213 R |
| 4,564,778 A | * | 1/1986 | Yoshida ..................... 310/177 |
| 4,704,075 A | * | 11/1987 | Johnston et al. ............. 417/407 |
| 4,978,279 A | | 12/1990 | Rodgers |
| 5,081,832 A | * | 1/1992 | Mowill ....................... 60/792 |
| 5,085,521 A | * | 2/1992 | Singh .......................... 384/99 |
| 5,096,376 A | * | 3/1992 | Mason et al. ............. 415/173.5 |
| 5,246,352 A | * | 9/1993 | Kawakami .................. 417/407 |
| 5,343,690 A | * | 9/1994 | Shekleton et al. ............. 60/778 |
| 5,523,635 A | * | 6/1996 | Ferreira et al. ................. 310/71 |
| 5,685,156 A | | 11/1997 | Willis et al. |
| 6,135,639 A | * | 10/2000 | Dede ........................... 384/99 |

(Continued)

FOREIGN PATENT DOCUMENTS

JP    06173714    6/1994

OTHER PUBLICATIONS

Richard Sanders, What is So Attractive About Microturbines, PowerLine Nov./Dec. 1998 pp. 26-29+55 Elliott Energy System Inc.

(Continued)

*Primary Examiner*—Michael Cuff
*Assistant Examiner*—Andrew Nguyen

(57) ABSTRACT

A hybrid microturbine to produce electrical output power within a engine housing, having a combustor, and a two spool multi stage compressor wherein the 1st spool has a compressor rotor and a turbine rotor as a turbocharger and the $2^{nd}$ rotor spool has an alternator rotor integrated with a compressor rotor and turbine rotor. The two individual compressor rotors have rotating blades attached and located in compressor housings with fluid communication. The alternator rotor as part of the $2^{nd}$ spool has permanent magnets integrated and positioned in close proximity and co-axial to the electrical stator module having an iron laminated structure with electrical wires. Relative rotational motion between the stator and alternator rotor cause electricity to be generated.

1 Claim, 9 Drawing Sheets

U.S. PATENT DOCUMENTS 6,314,717 B1  11/2001  Teets et al.
6,323,625 B1  11/2001  Bhargava

OTHER PUBLICATIONS

Aerospace Engineering, Small Gasturbines in the 21st Century Aerospace Engineering Aug. 1993 p. 17-20.
AI Magazine Jun. 1996 DNF for Patriot p. 83.
IGTI, Automotive Gas Turbines. Government Funding + the Way Ahead. pp. 17-21 p. 8-11 1995 vol. 35 No. 4 May/Jun. 1995.
Volvo Technology Report #2 1995, Advanced Hybrid Propulsion System for Volvo GCT. p. 1-12.
Turbomachinery International Jan./Feb. 1996, Power Gen Americas Small Gas Turbine Are big News. p. 16-19.
Mechanical Engineering Jun. 1996, Concept Trucks for City Deliveries p. 1.
Volvo Technology Report No. 2 1993, The Volvo High Speed Generation Hybrid Drive pp. 1-8.
Mechanical Engineering May 1978, Problems and Progress in Developing the Automotive Gas Turbine pp. 39-48.
Pratt + Whitney PowerPlant News Article on Michael Teets Oct. 25, 1974, Michael Teets Builds Jet Engine to get PLNA Job p. 2.
Turbo Machinery International Magazine Jan./Feb. 2001 vol. 42 No. 1, Into New Market: Elliott TA Series.
Gas Turbine International Nov.-Dec. 1975, Automotive turbine Advantages of three shaft configurations pp. 16-27.
Michael Valenti Associate Editor, Hybrid Car Promises high Performances and Low Emissions, Mechanical Engineering Jul. 1994 pp. 47-49.
David Gordon Wilson Massachusetts Institute of Technology Automotive Gas Turbine Gov Funding + the Way Ahead. IGTI 1995 vol. 35 No. 4 p. 17-24.
Mechanical Engineering Sep. 1997 Engine Demonstrations, p. 1.

* cited by examiner

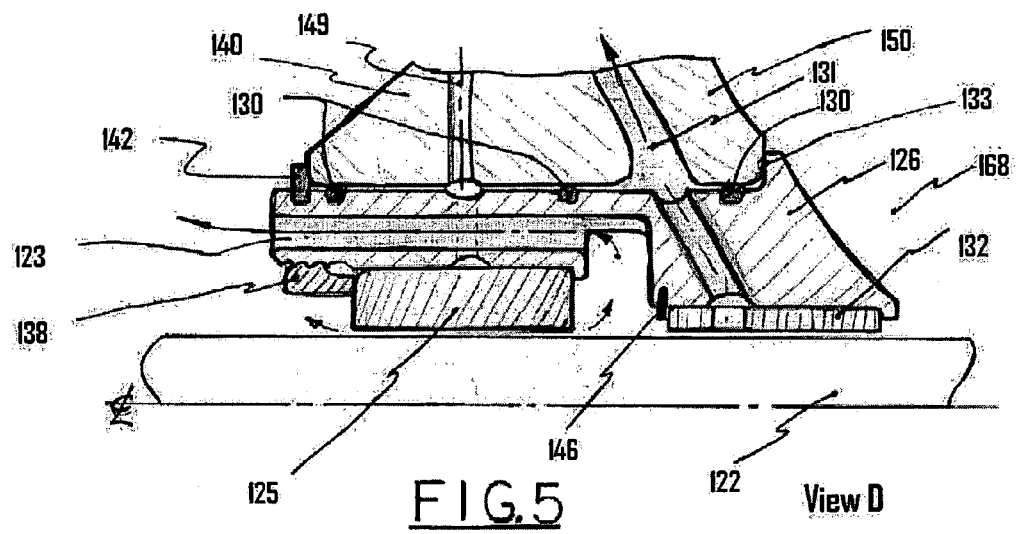
FIG. 5  View D
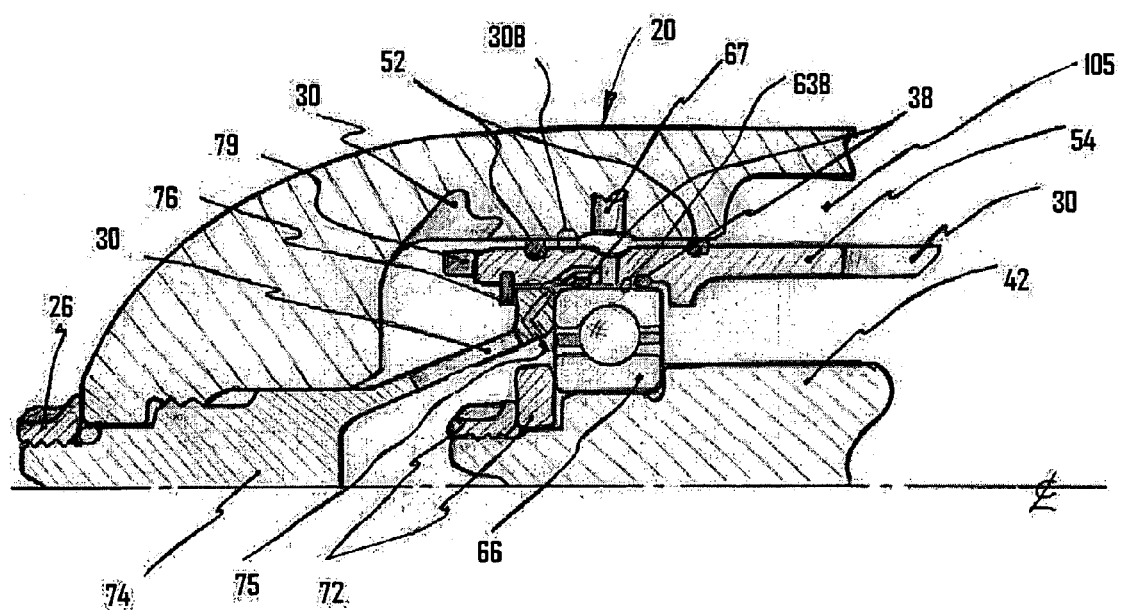
FIG. 6  View E

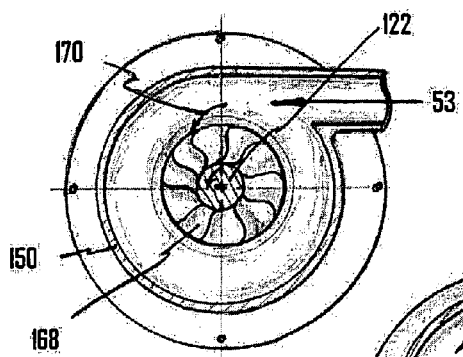
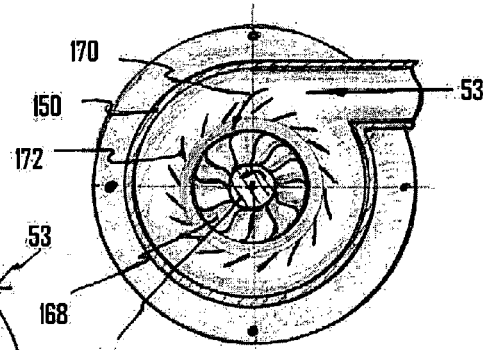
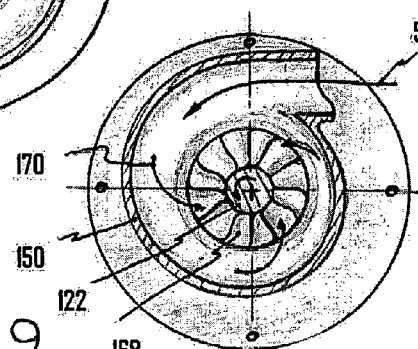
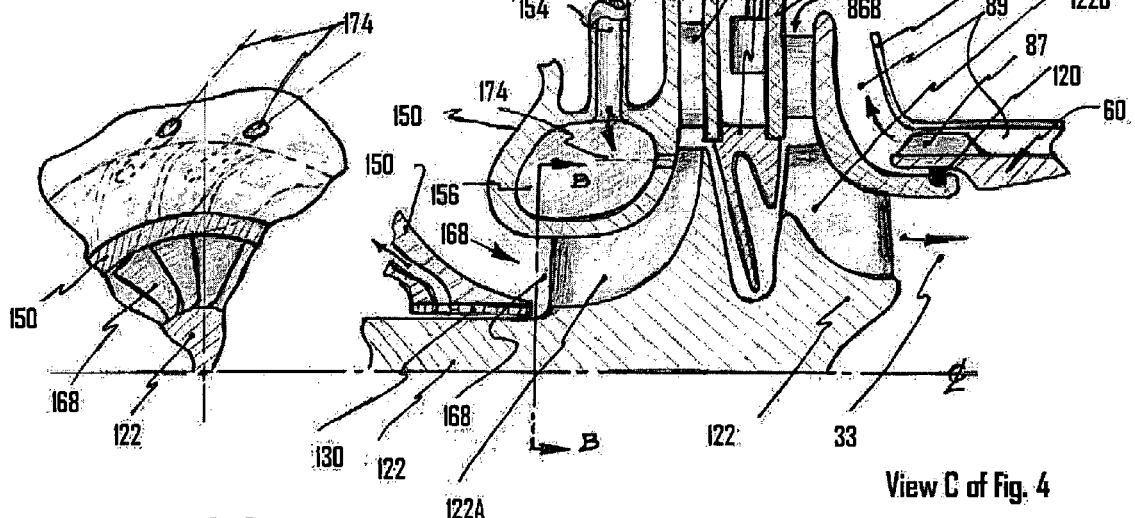
FIG.11
FIG.10
FIG.9
FIG.8
FIG.7   View C of Fig. 4

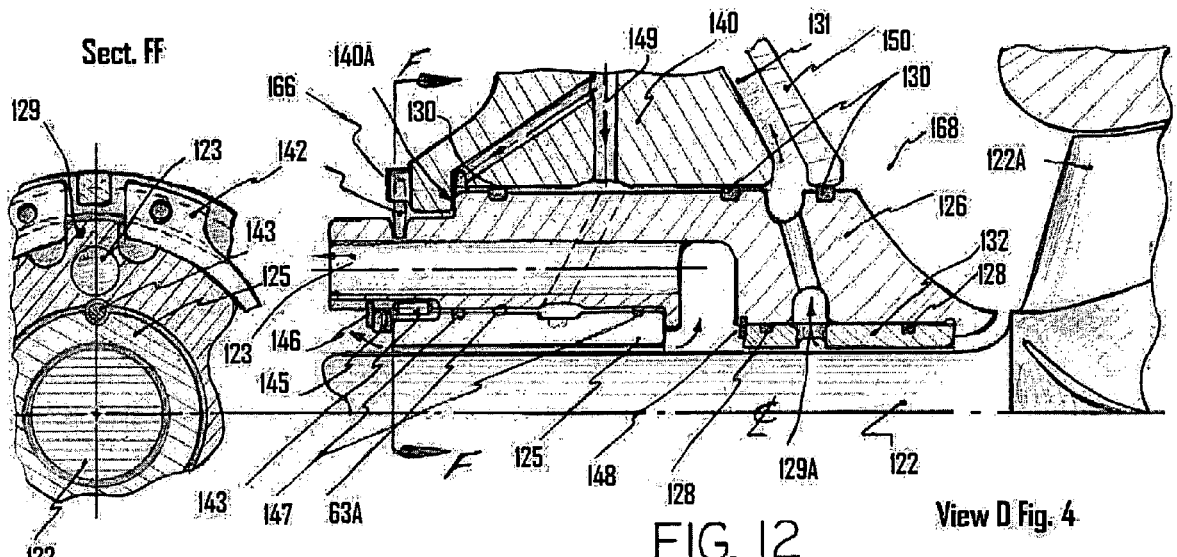
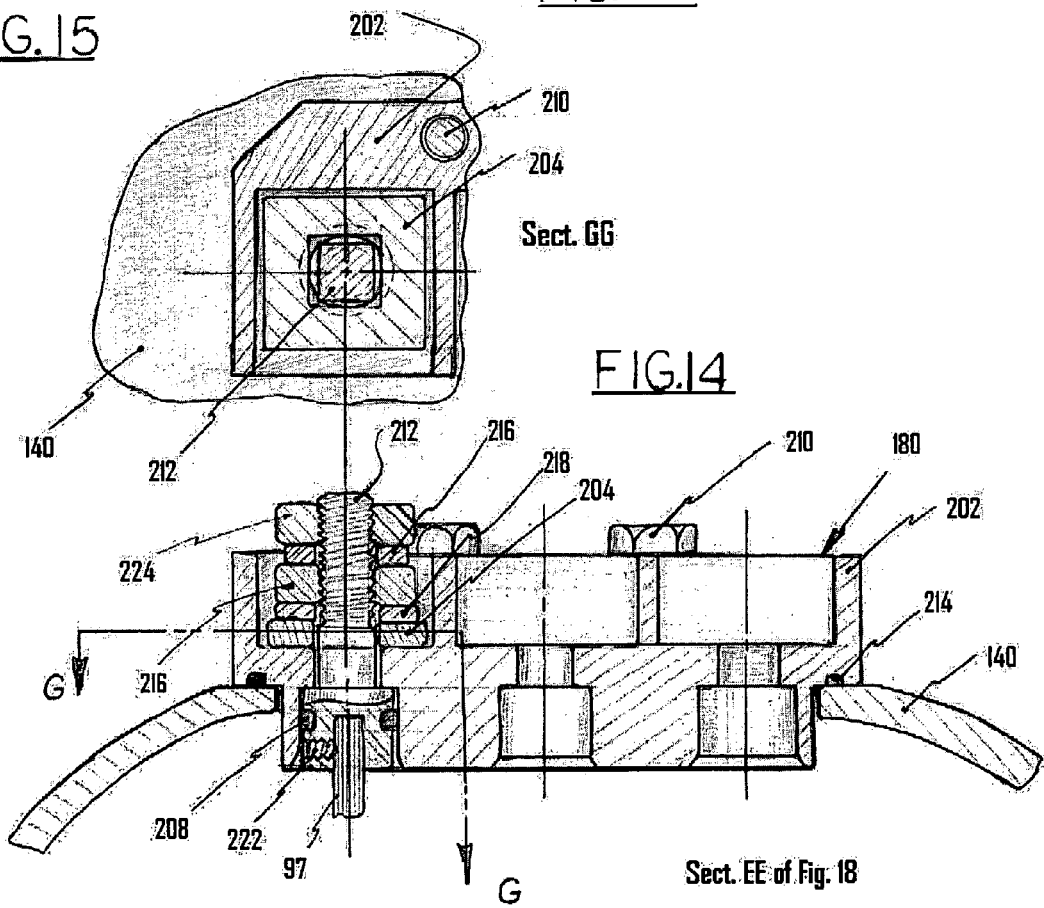

HYBRID MICROTURBINE FOR GENERATING ELECTRICITY

This application claims benefit of provisional application of Ser. No. 60/459,861 filed Apr. 2, 2003.

BACKGROUND OF THE INVENTION

1. Field of the Invention

This invention relates to a hybrid microturbine engine having a $1_{st}$ and $2^{nd}$ rotor spool and a turbo charged multistage compressor system where one rotor spool incorporates a turbine and compressor as the turbo charger and the $2^{nd}$ spool having a turbine, compressor, and an alternator rotor in close proximity and co-axially within a laminated iron base stator having wires to generate electricity.

2. Description of Prior Art

It can be appreciated that microturbine devices have been in use for years. Typically, a microturbine device is comprised of a single rotor spool with integral alternator attached and used in distributed electrical power generation. Companies include Elliott Energy Systems (EES), Turbec, Honeywell (some development effort only then bought out by GE) and Capstone with a wrap around heat exchanger was applied to a bus transport vehicle in a DOE power development program for low emissions considerations. Turbec/Volvo's VT100 microturbine with its external heat exchanger was tested in a bus transport application with low emissions and this engine became the base for Turbec's more recent effort of distributed electrical power applications. EES has not directed any effort toward vehicular applications. Currently the single spool microturbines are being used exclusively in a main or emergency electrical power source for distributed power generation with multifuel, low emission capability and higher durability compared to the piston type engines. Companies world wide have attempted to incorporate a gas turbine engines prior to the microturbines into vehicular applications since ~1950. Vehicular gas turbines have been designed and tested since 1950 with the initial idea from Mr. Huebner of GM in 1938. Typically gas turbine engines similar to piston engines tested in vehicles, operate most of the time <38% of the total capable engine power and is therefore important to have good part power efficiency for low fuel consumption. Many companies have attempted to implement gas turbine engines for main power into production vehicles thru design and test and include: Energy Transfer Co., Williams International, UTRC, PWA, GE, Kawasaki, US Army, NASA, Allison, US DOT-DOE, Volvo/United Turbine/KTT, ABB/Turbec, M.A.N., Volkeswagon, Mercedes, NREC, Concepts, MIT (also other universities), Brown and Boveri, Chrysler, Rover, Rolls Royce, Honda, Allied Signal/Garrett, Ford and GM. Avco Lycoming had successfully implemented the AGT 1500 gas turbine into the Abrams M1 tank and is currently used today. This is a two spool engine having a compressor pressure ratio>16:1, a free turbine for output power and a recuperator heat exchanger is incorporated for reduced power fuel efficiency gains. Most recently Capstone Turbine Corp. with its microturbine bus application reflect good low emissions.

Limited use is due to high total system cost, durability of the heat exchanger and air bearings not suitable for vehicle road travel with related G forces and clean air supply to the air bearings. Typical earlier prior art selected automotive power was less than 140 HP and 250 to 600 HP range for trucks or heavy equipment. The engines on the part comprised of <5:1 compressor ratio, mechanical gear boxes, electrical starting thru a gear box and a form of gas-hear recovery system which included either a recuperator (large weighty device) and limited to <1300 F inlet temperature or a ceramic type regenerator. Engine designs have incorporated (1) or (2) rotor[/]spools (a compressor/turbine rotor assembly), gear boxes and in some applications a free turbine making a three spool system like KTT. Engine speeds were usually near design conditions to avoid lower RPM critical shaft speed vibration issues and or blade frequency issues, requiring a means of governing output engine power thru air flow control thus lacking in part power fuel economy optimization if without a heat exchanger device. Ceramic materials for use in the hot turbine section offer improved engine fuel efficiency thru higher turbine inlet temperatures (2500 F) but material durability has been an issue. Extensive development in various countries since 1970 and to date have not yielded durable ceramic components for vehicle gas turbine integration. A target of 2500 F turbine inlet temperature (TIT) has been a goal to improve thermal efficiency, but higher combustor flame temperature will yield higher NOx with hydrocarbon fuel and air use and will need further combustor considerations. Correspondingly nickel/cobalt alloy turbine materials with (TIT)<1875 F have been predominately used and non cooled, for cost considerations although industry has proposed ~2000 F. Gas turbines continue to be of interest for various applications including vehicles for low emissions (without catalytic treatment), low weight, compactness, low maintenance, multi-fuel capability, no vibration and high engine durability as compared to the piston type power-plants which are designed to wear-out. Most recent gas turbine single spool microturbines have incorporated non synchronous high speed alternators with permanent magnets to the compressor/turbine rotor spool per initiating U.S. Pat. No. 6,314,717 offering reduced cost and simplicity. The Adkin U.S. Pat. No. 3,187,180 first implemented a generator rotor integration with a gas turbine engine removing the need for gearbox complexity and allowing for the first time frequency control independent of RPM engine speed; but power electronics remained costly and technology elusive to change high frequency and voltage to 60 HZ@ 110 or 220 volts as an example. The U.S. Pat. No. 6,314,717 patent further introduced a low cost, low emissions single spool gas turbine with affordable available technology and power electronics yielding the first low cost electrical power generation system. Exclusively, to date small gas turbines <500 HP (not microturbines) have been used in auxiliary power units (APU) with constant speed generators or air cycle machines all incorporating gearboxes and used as ground base gen-sets or in aircraft. The prior microturbine applications are toward maximum power levels in stationary electrical power needs with a total system cost too high for vehicular applications as well as specific start/shutdown cycle to maximize heat exchanger mechanical stress/life. The total system installation cost of less the $1000/KW was a target and less the $500/KW as a simple cycle associated (no recuperator) gas turbine was attained in an engine <100 kw had been demonstrated but without a heat exchanger included with a single spool concept. However, high fuel use would be prohibitive for continuous operation if fuel cost is an issue. Electrically starting the microturbine using the alternator has been introduced replacing the related gearbox needs but may be electronically too complex and cost prohibitive <250 KW engine due to power electronic hardware cost. With the advent of microturbines for electrical power generation, the vehicular application could be implemented with further engine system package "adjustment". The current vehicular power-train components like the transmission could be replaced with an electric motor.

The main problems with conventional microturbine devices for large scale usage are cost of the power electronics start system and the related heat exchanger. Considering the Capstone microturbine engine in a demonstrator vehicular application, although exhibited improved low emissions and reduced cost over the earlier prior art engine with gear box complexity, the system/package initial purchase cost is still an issue of high cost. Another problem with conventional microturbine devices are durability, although better than the piston type internal combustion engines, it needs improvement to further off-set the initial system expense thru reduced maintenance costs. The prior art microturbine applications are toward max power levels stationary electrical power needs and the total system cost is too high for vehicular applications. One of the main issues is to remove the costly heat exchanger and have the ability to reduce the rotor speed at off design maximum power to reduce fuel usage with the reduced compressor pressure ratio needs at lower rotor speeds. With the reduced engine rotor speed capability both rotor dynamic and component natural frequency need to be addressed. Another problem with conventional microturbine devices are performance. Need to have fuel economy to be 30 to 50% better than a piston engine is a 75 kw class engine and acceleration capability of 0 to 60 mph in <15 seconds minimum, have been requirements per Ford during the late 70's development program with the Garrett engine company. During these earlier tests, a 20% fuel economy improvement had been attained but the acceleration tests were marginal. Although a good high effective recuperator >90% has been experienced in a microturbine to yield good fuel economy (>29% cycle efficiency and better than conventional piston engine) durability is an issue. Also, during reduced power engine requirements, off loading from a high power levels using a current microturbine, the combustor flame stability will be an issue because of the initial stored heat energy in the recuperator device. The rotor system, with related rotor dynamics and or blade frequency could be of issue at reduced speed if not designed properly. The fuel control system may become complex and emissions be an issue during the engine transient operation using the current microturbines. In prior art the microturbine had controlled the engine power with fuel supply maintaining the engine at a constant or small range of engine speed and simultaneously varying the fuel flow level thus avoiding any rotor dynamic and or rotor spool-up lag issues. While these microturbine devices may be suitable for the particular purpose to which they address, they are not as suitable for providing electrical power generation for vehicular application. This new invention of a hybrid microturbine could also be used for non-vehicular application like the current microturbine. In these respects, the hybrid microturbine having a $1^{st}$ and $2^{nd}$ rotor spool, a turbo charged multistage compressor system, an integral alternator rotor with a close proximity stator wire/laminat system and a turbine to generate electricity according to the present invention substantially departs from the conventional concepts and designs of the prior art.

SUMMARY OF INVENTION

In view of the foregoing disadvantages inherent in the known types of microturbines now present in the prior art, the hybrid microturbine invention having a $1^{st}$ and $2^{nd}$ rotor spool, a turbocharged multistage compressor system, an integral alternator rotor within a close proximity stator wire/iron laminat system and a turbine combination provides a new electric power generating device. The purpose of the present invention, which will be described subsequently in greater detail, is to provide a new electric power generating system and has advantages over the prior art devices mentioned heretofore and many novel features that result which is not anticipated, rendered obvious, suggested, or even implied by any of the prior art, either alone or in any combination thereof.

To attain this, the present invention comprises a gas turbine engine incorporating (2) turbine/compressor rotor spool modules judiciously configured and housed. The #2 rotor spool, of the (2) rotor spools, incorporates bearings for rotatability, a turbine with blades attached to a hub, a compressor with blades attached to a hub, and an integral alternator rotor all positioned in the #2 housing. The #2 rotor spool develops rotational power to drive the integrated compressor and electrical alternator system thru the turbine wheel energy extraction of hot gas energy exiting the combustor. Within this #2 housing is an electrical stator co-axially positioned about the alternator rotor where relative rotational motion generates electricity. Also included in this #2 housing are: an electrical stator oil cooling sleeve, bearing supports, output electrical power leads, output electric terminal block, air start nozzles within the compressor shroud area, a #2 compressor inlet duct to accept air from the #1 compressor exit. Attached to the #2 housing aft end of the compressor housing section is the diffuser and communicates with the combustor entrance and also attached is the #2 turbine nozzle and communicates with the combustor exit with a multi-piece seal plate between the compressor/diffuser and turbine nozzle to control compressor cooling air flow to the turbine hub. As an assembly this becomes the #2 spool housing module. The #2 spool module which is insertable as a system into the #2 housing, incorporates an aft bearing-seal housing between the alternator rotor and #2 compressor rotor and has OD oil seals axially displaced about the common cylindrical gap between the #2 housing ID and the aft bearing-seal housing OD to supply oil to the bearing and act in partial as an oil squeeze film damper area.

The #1 spool housing module as a turbo charger has a compressed air exit that communicates with the #2 compressor inlet and is positioned in the #1 housing. The #1 rotor spool has bearings for rotation, a turbine rotor with blades attached to a turbine hub and a compressor rotor with blades attached to a compressor hub and as an assembly is housed within the #1 housing communicates with the compressor housing. Bearings are mounted in the related #1 housing and have oil squeeze film dampers. Also, a compressor diffuser and turbine nozzle are attached to the #1 housing aft end to create the #1 spool housing module. This #1 spool housing module is a turbo charger and the #2 spool housing module is the electrical power generating module and both connect to the combustor housing. A combustor is within the combustor housing where fuel is supplied to develop heat energy and drives the #1 and #2 turbine rotors of the related spools. The combustor gas heat energy is directed first to the #2 turbine thru the #2 turbine nozzle, and exiting this #2 turbine rotor the energy gas is ducted to the #1 turbine and thru a #1 turbine nozzle. The #1 housing retains the #1 rotor spindle sleeve. The #1 rotor spindle sleeve retains the bearings and shaft seal with the #1 rotor spool and is axially positioned and retained within the #1 housing from one end by a rotor retainer device. The #1 housing receives the #1 spool module as a package and has a common circumferential radial space for oil supply to the bearings and the squeeze film damper rotor dynamic control area. Bearings have oil squeeze film damper on the cylindrical outside diameters of the bearings. Oil is supplied to the bearings and simultaneously thru the housing common dynamic clearances with seals. The #1 spool housing module system develops compressed air thru rotating blades, receives air from ambient supply and is driven by the #1 turbine from the hot gases exiting the #2 turbine discharge. A multi-piece seal between the compressor and turbine minimizes compressor leakage to the turbine disk. There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways.

Also, it is to be understood that the phraseology and terminology employed herein are for the purpose of the description and should not be regarded as limiting.

A primary object of the present invention is to provide a hybrid microturbine as an electric power generating system, using two rotor spools, having a turbo charger and an alternator integral to one rotor spool and an iron laminat stator with electrical wires.

An object of the present invention is to provide an electrical power generating system having two rotor spools, a turbo charger, and alternator rotor that will overcome the shortcomings of the prior art devices and fully utilize the hybrid microturbine features (variable speeds for off design power and increased cycle pressure ratio).

Another object is to provide a electric power generating system with two rotor spools one as a turbo charger and the other spool incorporates an alternator to create electrical energy thru the use of a gas turbine engine. This will yield a compact, low weight, low emission, reduced cost, multi-fuel use, vibration free, high durability and black start capable hybrid microturbine. Also will remove the need for a recuperator/regenerator, decreasing the initial cost and increasing durability.

Another object is to provide an electric power generating system having two rotor spools, one acting as a turbo-charger and the other spool with an integrated alternator to generate electricity has modular rotor/spools either as a (2) piece system (for housing installation) in the #2 spool or as a (1) piece type in the #1 spool modular system. Oil squeeze film dampers are incorporated in the outer most modular areas and interact with the respective static engine housings. This arrangement allows not only good rotor damping but yields the capability of optimum final spool balance without disassembly and subsequent reassembly in the engine housings. With this described rotor system/overhung type design subassembly, a greater range of engine rotor speed (rpm) can be attained yielding improved component compressor and turbine efficiencies through minimized airflow and blade to case clearance along with lower speeds for off-design power requirements thus allowing improved fuel efficiency.

Another object is to provide an electric power generating system, having two rotor spools, one acting as a turbo charger and the #2 rotor spool having an integrated alternator to generate electricity, have rotor spool subassembly shaft seals and related bearing mounts have a common dampened housing yielding less shaft to seal excursions—minimizing related compressor air seal flow leakage.

Another object of this hybrid microturbine invention is to provide a electric power generating system, having two rotor spools, one acting as a turbo charger and the $2^{nd}$ rotor spool having an integrated alternator to generate electricity is to reduce the turbine power necessary to drive the compressor allowing more available to drive the related alternator, thus improve fuel economy. A preferred embodiment could incorporate a moveable plate or vanes within a divergent supply duct communicating with the #2 compressor inlet allowing in one configuration reduced air duct supply velocity for direct air flow radially toward the rotor axis or impart an air preswirl (with rotation) to optimize the related inlet blade incidence angle thus reducing the require power to drive the compressor.

Another object of this invention is to provide an electric power generating system, having two rotor spools, one acting as a turbocharger and the $2^{nd}$ spool having a integrated alternator to generate electricity is to incorporate an air start system that starts the gas turbine engine thru impingement channels to direct air tangentially onto the $2^{nd}$ compressor outer diameter area removing the cost of an electrical starter system of the prior art microturbine. The invention would also remove the need for batteries with related costs and complexities of maintaining a charge and or electrolyte level. Combining the invention of this 2 spool engine rotor system with this air starting capability there could be no start limitations other than set maximum EGT (exhaust gas temperature) hot or cold starts. During the air impingement operation the rotor rotation of the #2 spool, the alternator with its relative motion to the electrical stator wire winding/iron core laminat, electricity begins to be generated and for a black start it will be used for such operations of fuel pump, fuel flow control and ignition during the start cycle at speeds beginning at ~10% maximum rotation speed, could be thru stored pressure without a need for electromechanical fuel control operation. Also another significant feature of the air start system is the ability to incorporate an air chamber about the compressor housing to act as an acoustic damper of the frequencies typical to the compressor stage whether it be noise or simply dampen the driving force which may be structurally critical to an engine component related natural frequency. The air impingement tangent supply channels communicate between the compressor/blade cavity and start air supply annulus around the compressor housing, the latter could be used to assist in removing/damping pulses that could damage rotor blades.

Another object of this invention is to provide an electric power generating system, having two rotor spools, one as a turbocharger and a $2^{nd}$ rotor spool incorporating an alternator to generate electricity is to incorporate a retention device for the $1^{st}$ spool module assembly to the #1 housing thru a single point/area and be used for axial positioning of the #1 rotor spool without shims, accept the related operational rotor thrust load and yet allow the $1^{st}$ rotor spool relative radial dynamic movement.

Another object is to provide a electric power generating system, having (2) rotor spools, one as a turbocharger and the $2^{nd}$ rotor spool incorporating an alternator to generate electricity and incorporate a cooling means to the turbine housing static seal ring area, support the combustor inside diameter and regulate the combustor cooling/dilution air flow around the combustor. Different alloys are used for cost consideration and specifically if an OD case material has a higher expansion rate, it could grow away from the seal causing leakage past the turbine thru the seal resulting in lost power and engine efficiency losses. A circumferential array of axially aligned fins could be incorporated on the outer seal case structure to draw the heat away by the passing combustor cooling/dilution air and thus reduce the related expansion of the case away from the seal rings.

Other object and advantages of the present invention will become obvious to the reader and it is intended that these objects and advantages are within the scope of the present invention.

To the accomplishment of the above and associated objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5 is a cross-sectional assembly view D FIG. 4 of the $2^{nd}$ rotor-aft-bearing-seal housing of the present invention.

FIG. 6 is a cross-sectional view E FIG. 3, partial $1^{st}$ spool housing module of the present invention.

FIG. 7 is a cross-sectional view C FIG. 4, $2^{nd}$ spool air start housing area of the present invention.

FIG. 8 is a partial front view section BB FIG. 7, the $2^{nd}$ spool air start housing area of the present invention.

FIG. 9 is a front sectional view AA of FIG. 4, $2^{nd}$ compressor inlet preswirl tapered duct option, of the present invention.

FIG. 10 is a front sectional view AA of FIG. 4, $2^{nd}$ compressor inlet preswirl vaned duct option, of the present invention.

FIG. 11 is a front sectional view AA of FIG. 4, $2^{nd}$ compressor inlet preswirl duct of constant annulus option of the present invention.

FIG. 12 is a cross sectional assembly view D of FIG. 4, 2nd spool aft bearing-seal housing and engine housing of the present invention.

FIG. 13 is a cross sectional view EE of FIG. 18, the alternator terminal block assembly of the present invention.

FIG. 14 is a cross sectional view GG of FIG. 13, the alternator terminal block-washer-lug area of the present invention.

FIG. 15 is a cross sectional view FF of FIG. 12, the $2^{nd}$ spool aft bearing retention of the present invention.

DESCRIPTION OF THE PREFERRED EMBODIMENT

Figure 1:
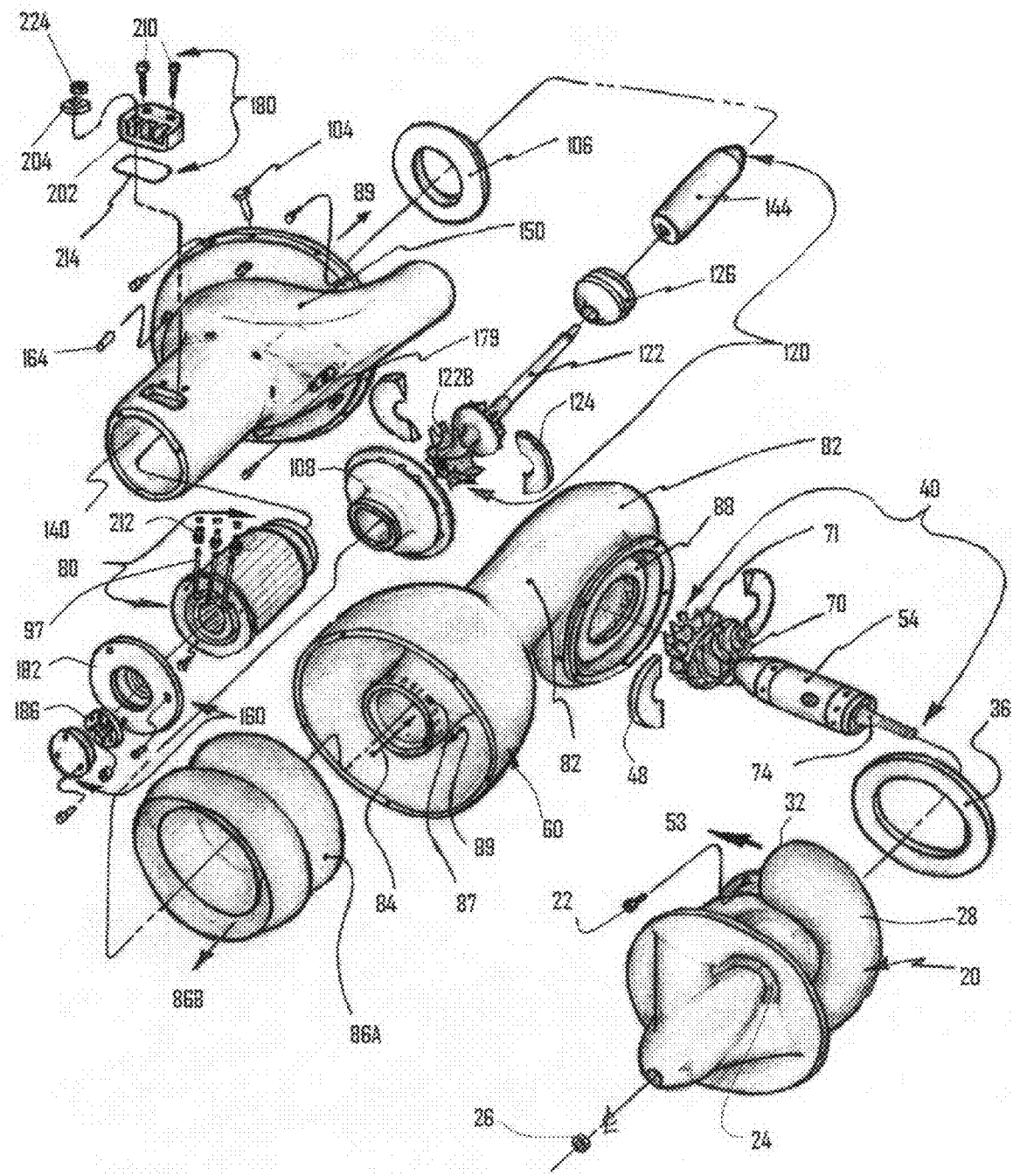
FIG. 1 is an orthogonal-exploded-pictorial drawing of the present invention.

Turning now descriptively to the drawings, in which similar reference characters denote similar elements throughout the several views, the attached figures illustrate a hybrid microturbine electric power generating system, having two rotor spools, one as a turbo charger, the $2^{nd}$ rotor spool with an integral alternator all of which are housed electrical stator coaxially positioned about this rotor to create electrical power.

The $2^{nd}$ rotor spool assembly and electrical stator assembly with cooling sleeve and electrical power out leads are retained in the #2 housing along with the $2^{nd}$ compressor diffuser and $2^{nd}$ turbine nozzle. The #1 spool module communicates with the #2 compressor inlet and as a turbo charger creates compressed air/working fluid and is positioned in the #1 housing with a compressor diffuser and turbine nozzle. The combustor housing attaches to the #1 and #2 spool housing modules and combustor where fuel is supplied to develop heat energy to drive the $1^{st}$ and $2^{nd}$ turbine rotors thru corresponding gas directional components the $1^{st}$ and $2^{nd}$ turbine nozzles respectively. The #1 housing is part of the turbo-charger stage and retains the $1^{st}$ spool module assembly, communicate with the combustor housing accepting hot gas energy exiting the $2^{nd}$ turbine rotor, begins the Brayton cycle with the air intake to the $1^{st}$ spool rotor/compressor and supplies compressed air flow to the $2^{nd}$ spool rotor/compressor inlet. A thrust bearing is incorporated into the $1^{st}$ rotor spool, rotor spindle sleeve and thru a common rotor retainer device, is attached to the #1 housing for axial positioning and related rotor thrust loads. The #1 housing receives the $1^{st}$ rotor spool assembly as a dynamically balanced module and has a relative fluid dynamic gap between the said spool assembly and the static #1 housing to assist in the rotor dynamic stability.

Oil is supplied to the bearings and simultaneously thru the housing oil squeeze film radial clearances having seals. The $1_{st}$ spool module develops, within the #1 housing, compressed air in this first stage from rotating blades driven by the $1^{st}$ rotor/spool turbine using energy from the hot gases exiting the $2^{nd}$ turbine rotor and also incorporates a multi-piece seal between the compressor and turbine rotors to separate the air and gas flows. The combustor housing retains the combustor for the development of fueled hot energy, attaches to the #1 spool housing module and the #2 spool housing module. The hot gas energy after the #2 turbine rotor is ducted to the #1 turbine nozzle where it is accelerated and directed to the $1^{st}$ turbine wheel having blades to drive the $1^{st}$ compressor. The #2 nozzle directs and accelerates combustor fueled energy to the $2^{nd}$ turbine rotor with blades for power to drive both the compressor and alternator rotor the latter of which provides electrical output power thru the alternator rotation relative to the stationary stator wires and iron laminats. The $2^{nd}$ rotor spool has bearings with squeeze film dampers and an aft bearing supported by a damped housing and as a module is received into the #2 housing. The front bearing positions the rotor relative to the housing and accepts a resultant rotor thrust load. The #2 housing incorporates: and electrical output stator with a cooling means, output electrical power leads and output electric terminal block, an air start housing and the $2^{nd}$ spool module the latter of which compressor intake accepts compressed air from the $1^{st}$ spool compressor discharge and communicates the combustor housing. There are associated controlled case radial static clearances between the $2^{nd}$ spool module assembly and the #2 housing and also at the bearing outside diameters with oil squeeze film dampers for improved rotor stability.

The alternator stator has a cooling sleeve attached to the outside diameter and insertable into the #2 housing and uses an oil media. The electrical power output assembly incorporates sealed metal leads within an electrical insulating block to allow external power lead attachments and attached to the #2 housing/engine case such to prevent oil leakage. Depending on the electrical phase requirements, the lead quantity could be 1, 3, 6 or more.

Figure 2:
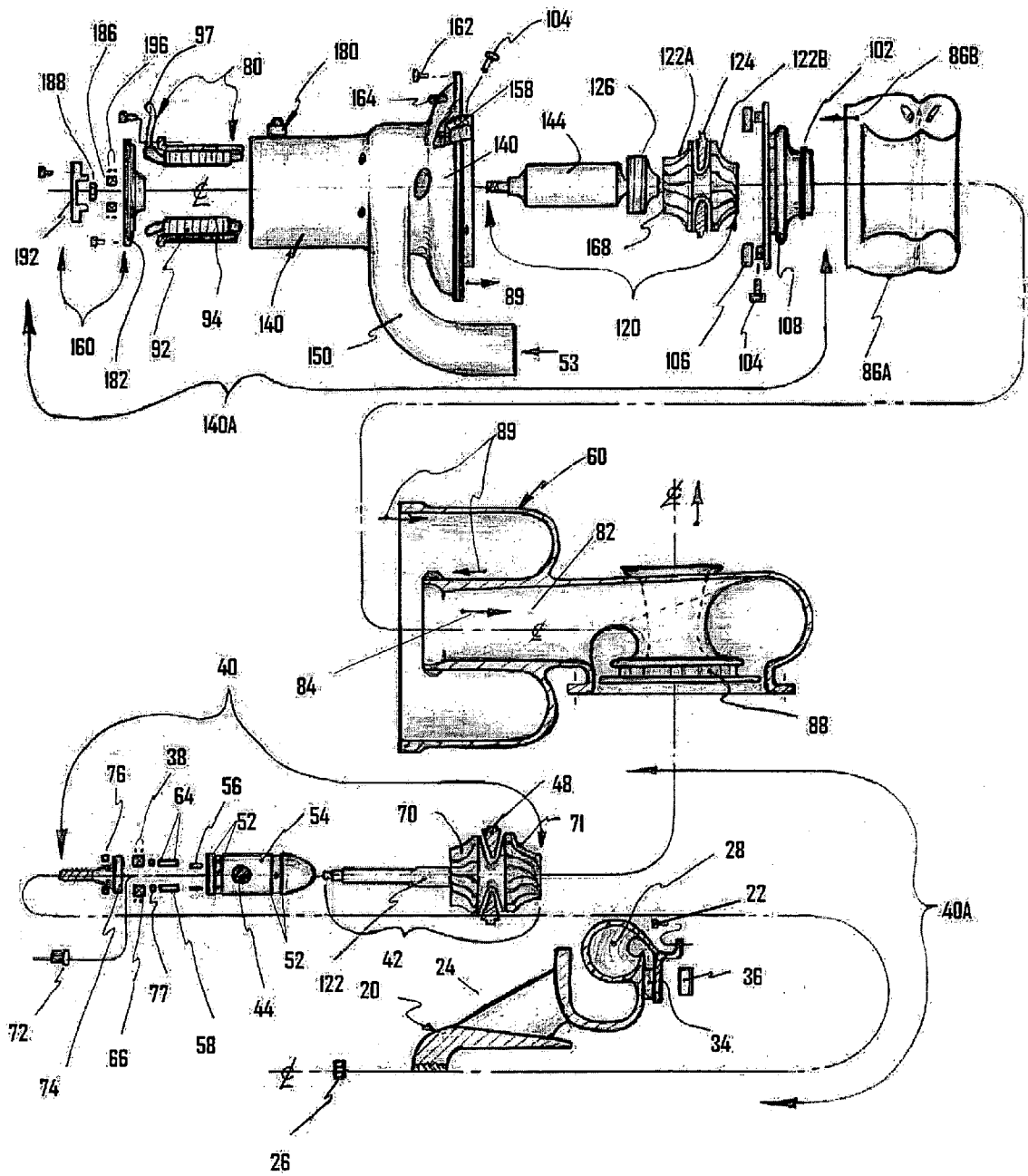
FIG. 2 is a 2 dimensional-exploded-pictorial drawing of the present invention.
Figure 4:
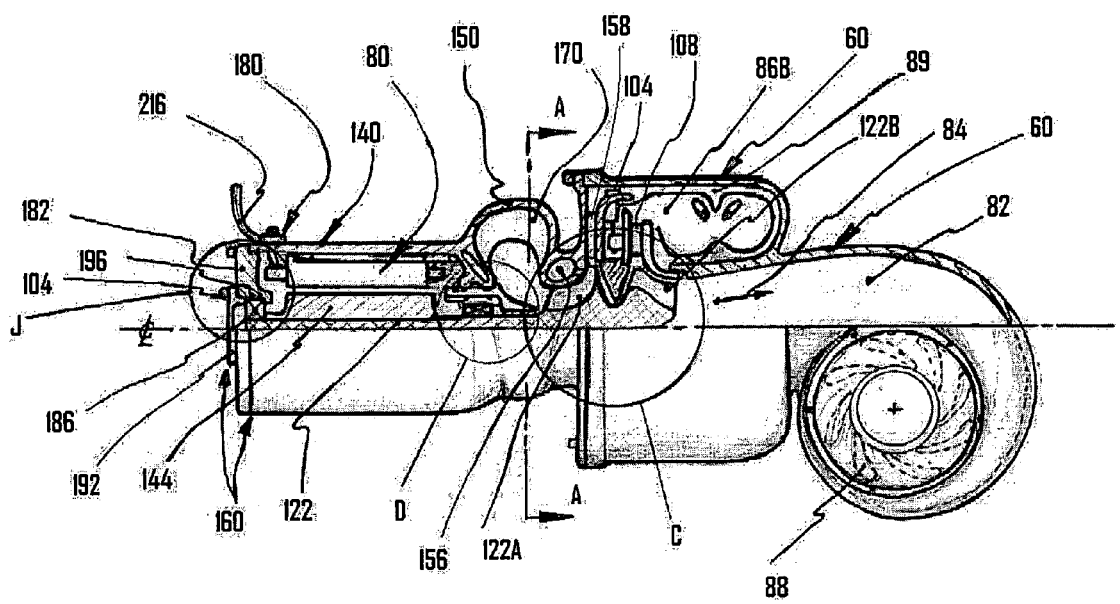
FIG. 4 is a cross-sectional view of the $2^{nd}$ spool housing module of the present invention.
Figure 3:
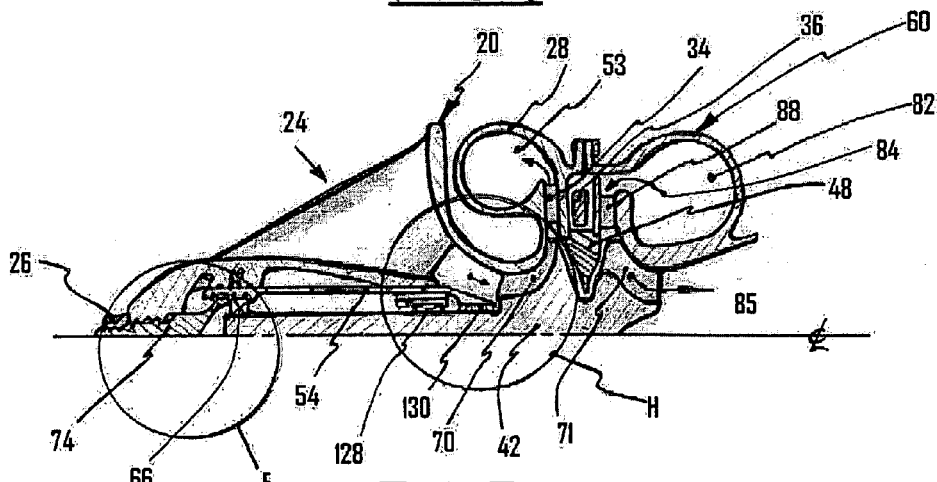
FIG. 3 is a half cross-sectional view $1^{st}$ spool housing module with case attachment of the present invention.

The #1 housing 20 is part of the turbo-charger stage, retains the $1^{st}$ spool module assembly 40 communicates with the combustor housing 60 accepting hot gas energy 84 downstream of the $2^{nd}$ spool/rotor turbine 122B. The Brayton Cycle begins with the air intake feature 24 of the #1 housing 20 and air flows thru the $1^{st}$ compressor 70 of $1^{st}$ rotor spool 42 and discharges out the compressor exit 53 of the compressor diffuser 34 and scroll 28 and on to the $2^{nd}$ rotor inlet compressor duct 150. The $1^{st}$ stage turbine nozzle 88 in close proximity to the $1^{st}$ stage turbine 71 with case insulation insert 36 to minimize radiant heat from the turbine to the compressor-diffuser 34, directs and accelerates hot gases 84 toward the bladed turbine rotor 71 to drive the integral compressor rotor 70. A thrust bearing 66 is attached to the rotor 42 compressor shaft and secured with nut/washer 72 and thru a common outer bearing race retainer 74 and with a common retention means 76, rotor spindle sleeve 54 with rotor threaded retainer 74 is axially positioned within the housing 20 having receiving inner thread for receiver 74 and secured with nut 26. The housing 20 receives the $1^{st}$ spool module assembly 40 as a dynamically balanced system and has a relative fluid dynamic gap 30B, 30A between sleeve 54OD of the $1^{st}$ spool module 40 and #1 housing 20 with supply oil 67 to bearing transfer having seals 52 in spindle sleeve 54 and with controlled oil film dynamic gap 30B, 30A oil squeeze film dampers. Oil drains away from bearings 66 and 58 via channels 30 and 105. Also, as another means oil squeeze film damping about the outer bearing race areas with seals 38 and 64. Oil is channeled 67, jetted 75 to the bearings 66, 58 thru the damper area 63B, 30B, 30A and 63A. FIG. 1 illustrates an orthogonal exploded pictorial drawing of the present invention hybrid microturbine. FIGS. 3 and 4 are supportive, depicting ¼ cross-sectional assemblies of the $1^{st}$ and $2^{nd}$ spool modules and housings. The $1^{st}$ spool module assembly 40 is dynamically balanced as a system and then located within the #1 housing 20 having relative case to spool assembly dynamic clearances with seals and oil squeeze film damping. The #1 spool housing module 20/40 is attached to the combustor housing 60 and secured with fasteners 22. The combustor 86A is incorporated in the housing 60 to develop fueled energy via fuel supply 164 and a turbine nozzle 88 directs the hot gases to the $1^{st}$ spool turbine wheel 122B to drive the integrated spool compressor 122A and alternator rotor 144. The heat shield 106 minimizes the radiant heat to the compressor-diffuser 158 within housing 140. A multi piece seal plate 124 controls cooling air flow to the $2^{nd}$ rotor turbine hub 122B. The hot energy gas 84 exiting the turbine wheel 122B is ducted 82 to the #1 turbine nozzle 88 where it is then accelerated and directed to the $1^{st}$ turbine blades 71 which in turns drives the $1^{st}$ rotor spool 42 with compressor blades 70 to yield pressure and air flow. The heat shield 36 minimizes the radiant heat to the compressor diffuser 34 adjacent to and within the housing 20. A multi-piece seal plate 48 separates the turbine supply hot gases 84 from the $1^{st}$ rotor spool 42 compressor 122A and regulates the cooling air flow to the turbine hub 122 and can be retained between the turbine nozzle and diffuser either by radial pins like 104 of FIG. 2 or simply sandwiched/pinched between the back of the diffuser 158 of FIG. 2 and turbine nozzle 88. Air flow for this gas turbine engine enters/begins at the intake 24, then flows into the compressor wheel where blades 122 A of spool 40 yielding high blade exit velocity, and thru the diffuser 34 where a high static pressure is attained thru reduce velocity and then into and thru scroll 28 of housing 20. With pressure and volume the air exits 53 of scroll 28 then into the #2 compressor spool inlet duct 150. Oil supply and drainage are not shown for simplification. The structure material can be metal or non-metal, the scroll or the compressor exit area past the diffuser could be of various forms other than round cross section and or about a constant radial position. The housing could be cooled by means of a channeled fluid as an intercooler for reducing the air temperature thus increases the power density. Means to attach this housing 20 to the hot gas section can be other than a flange/bolt arrangement for example, a typical turbocharger clamp. This hybrid microturbine has higher power density over prior art. The $1^{st}$ spool module 40 is retained in the #1 housing 20, and develops compressed air in this first stage from hot gas energy 33 from the $2^{nd}$ stage turbine 122B exiting side to drive the $1^{st}$ stage turbine rotor. FIG. 1 shows the $1^{st}$ spool housing module 40 and FIG. 2 shows the related details FIG. 1.

Figure 16:
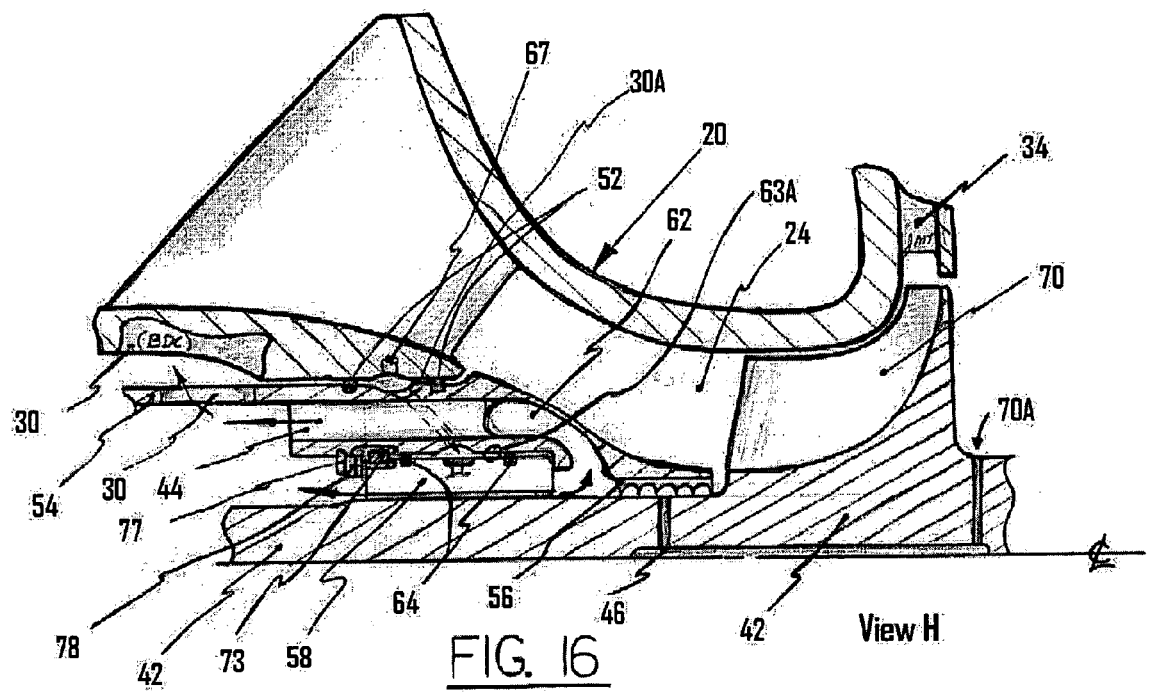
FIG. 16 is a side cross sectional view H of FIG. 3, the $1^{st}$ spool housing assembly aft bearing-seal area of the present invention.

FIG. 3 depicts the $1^{st}$ spool module 40 positioned within the housing 20. FIG. 6 relates more specifically to the retention and bearing area of the $1^{st}$ spool module 40. FIG. 16 depicts the 1st rotor spool within housing 20 and relationship of the aft bearing 58 seal 56 rotor spindle sleeve 54 and o-ring seal 64, 52 with dynamic oil squeeze film dampers areas of controls radial clearances between the bearing 58 and spindle sleeve 54 and case 20 and spindle sleeve 54. Oil flow is channeled 57 to the bearing 58 and jet 75 directed to bearing 66 and #1 housing 20 houses spindle sleeve 54. The $1^{st}$ rotor spool module compressed air the $2^{nd}$ spool rotor compressor inlet 122. The $1^{st}$ rotor spool [assembly] 42 incorporates a compressor, turbine and compressor shaft which can be 1 cast unit, separate details bolted together or preferably an inertia welded structure typical to the automotive turbo chargers. The $1^{st}$ rotor spool 42 is a cantilever design having the bearing in a cool section to avoid a balance issue of a bowed rotor hot restart yielding rotor dynamic instability. This invention is not limited to the cantilevered rotor system of bearings one end of the rotor and could be straddle mounted with a bearing on each end of the rotor (oil is subjected to hot end contamination via excessive heat) and housed accordingly. A multi-piece seal detail 48 controls the air flow from the compressor to the turbine hot section, a means of cooling the turbine hub 122. Controlled radial clearances for rotor dynamic stability are incorporated between the spindle sleeve 54 and #1 housing 20.

Rotor spool 42 thrust loads thru bearing 66 and rotor retainer device 74 to #1 housing 20, the retention means 76 axially retains the rotor retainer device 74 and thrust bearing 66. Oil drainage is by gravity thru channels 30. The bearing 66 is retained on the rotor 42 by a nut and washer 72. Reference FIGS. 1,2,16 and 19B defines the aft bearing area of the #1 spool module 40.

Figure 19A:
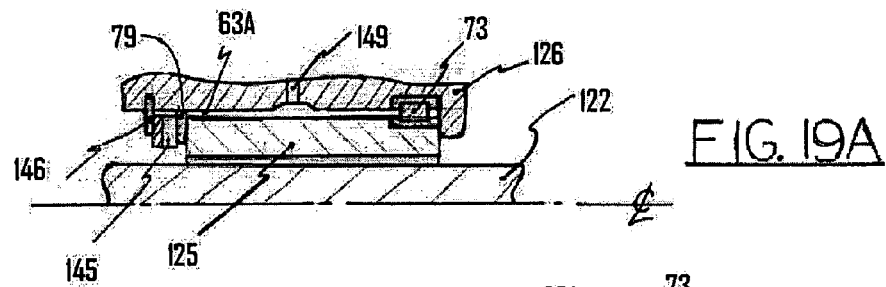
FIG. 19A is a partial cross sectional assembly view D of FIG. 4, 2d spool aft bearing housing of the present invention with bearing end sealing.
Figure 19B:
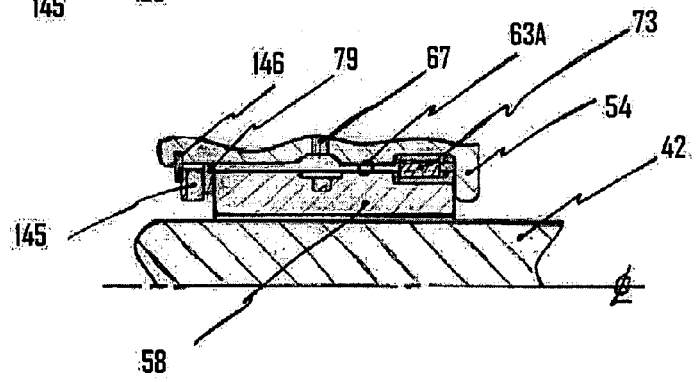
FIG. 19B is a partial cross sectional assembly of the $1^{st}$ spool aft bearing seal housing with bearing end sealing.

Bearing 58 is positioned in the #1 rotor spindle sleeve 54 with a controlled radial gap oil squeeze film damper 63A and seals 64 could be replaced with a controlled axial face gap at either bearing 58 end such to control the leakage flow oil flow. In FIG. 19B the end seal 79 would restrict the oil flow with an axial face spring 78 and retainer 77 are incorporated along with an anti-rotation pin 73 is clearance fitted between the bearing 58 outer diameter and housing 54 having a common receiver and allow bearing limited motion for $1^{st}$ rotor spool 42 dynamic motion control. Oil is supplied thru cavity 67 and to the hydrodynamic bearing with thru flow about the compressor shaft 70 discharging to drainage areas 30, 44, and 62. The labyrinth seal 56 is start here incorporated to keep the oil from the air flow path 24 and is pressurized with air from channel 46 air pressure from the #1 compressor aft cavity 70A. The labyrinth seal 56 and bearing 58 thru a common #1 rotor spindle sleeve 54 retention have similar radial motion with compressor shaft 42 thru the oil squeeze film damping area 30A with the O-ring 52 area cavities and thus lessons the lab-seal 56 shaft area wear. Also the O-rings 52 in the front and aft bearing seal the oil flow in the #1 rotor spindle sleeve 54 could also act to prevent circumferential movement from the bearing/shaft resultant forces but as a safety measure an anti-rotation lug 79 or pin could be incorporated to interact with the #1 housing 20. The Combustor Housing 60 of FIGS. 1, 2, 4 and 7 houses the combustor 86A, the #1 spool housing module 40A and the #2 spool housing module 140A are retained. The hot gas energy 86B thru the nozzle 108 drives the #2 turbine 122B of #2 spool module 120 and serially ducted 82 hot gases 84 pass thru nozzle 88 to drive the #1 turbine 71 of #1 spool 42.

The combustor 86A receives fuel from injector 164 and is combusted within yielding energy-resultant hot gases 86B. The #1 spool housing module 40A is attached to the aft end of the duct 82 of housing 60 with integral turbine nozzle 88 and sandwiched between the diffuser 34 is the multi-piece seal plate 48 and heat shield 36. The forward open end of housing 60, receives and mounts the #2 spool housing module 140A.

The housing 60 radially inboard area about the exhausting area 84 are located radial fins 87 aligned to the passing combustor dilution air flow such to remove case heat from the static seal land and adjacent assembled seals 102 and could support the combustor inner diameter, also this fin area could be used to regulate the dilution air flow to the exiting end of the combustor 86A. If the turbine nozzle were not integral to the case 60 addition aft seals like 102 could be integrated along with radial pins like 104 reflective of the #2 nozzle retention depicted. The housing structure would see temperatures as high as 1350 F and could be cast and or of sheet metal/bar stock construction. The combustor case 60 although showing an annular combustor positioned as a reverse flow type, it could be reconfigured to accept other design (example a can type). Furthermore an external heat source could be incorporated removing the need of internal combustor.

The #2 turbine nozzle 108 is a device to direct and accelerate combustor gases 86B onto the $2^{nd}$ turbine rotor blades 122B of the $2^{nd}$ rotor spool 120 to supply rotational power to the compressor 122A and alternator rotor 144 and can be viewed in FIGS. 1, 2, 4 and 7. This detail uses material capable of 1950 F. The nozzle 108 is retained axially against the multi-piece seal plate 124 by radial pins 104 allowing radial differential thermal gradient movement between the diffuser 158 and turbine nozzle 108. Seal 120 is installed into the nozzle 108 and prevents air 89 leakage into the inner duct area 84 of scroll 82. Hot gases exiting the nozzle 108 creates power thru the 122B turbine of rotor 122 and exits the turbine axially into the case 82 area of case 60. The turbine rotor 71 extracts energy from the hot energy gas stream 84 and converts to rotational power. The nozzle 108 depicts a radial inflow turbine wheel application but with a different design an axial type turbine wheel could be configured. If ceramic materials become available, higher turbine inlet temperatures>1950 F could be used for higher power output. Although radial pins 104 are depicted the turbine nozzle and compressor could be of one unit and attached to the housing 140 with a multi-piece seal 124.

The $2^{nd}$ rotor spool assembly 120 develops rotational power to drive the integrated compressor 122A and electrical alternator rotor 144 thru the turbine wheel 122B energy 86b extraction allowing an increase in the compressor 122A pressure of the #2 spool 122 rotor and provide electrical output lead 212 energy thru alternator 144 resultant to the relative motion to the stationary stator wires and iron core laminats system 80. The 2 rotor spool [assembly] module 120 can be viewed in FIGS. 1,2,4,5,7,12 and 17. This spool accepts fueled energy expanding hot gases 86B thru the $2^{nd}$ turbine nozzle 108 directing/accelerating onto the turbine blade 122B to drive the compressor 122A and alternator 144. The compressor shaft 122, compressor 122A and turbine 122B are conventionally welded like turbocharger of the automotive field for reduced cost. A multi-piece seal 124 is positioned to regulate the compressor cooling air to the turbine disk/blade 122B area. The bearing-seal housing 126 in $2^{nd}$ spool module 120 is integrated between the alternator rotor 144 and compressor rotor 122A and has air and oil seals 130 of FIG. 5. The module 120 allows for final balance without rotor disassembly related case installation. The bearing-seal housing 126 with the preferred embodiment is depicted in FIG. 12 and retains the aft bearing 125, associated oil seals 147, anti-rotation pin 143, axial retention spring washer 145 and retainer 146. A controlled radial gap 63A is incorporated between the bearing 125 and housing 126 to allow for an oil squeeze film damping system to control the rotor dynamics of rotor spool module 120, shaft 122. As an alternative to FIG. 12 bearing arrangement, FIG. 19A could be implemented where the hydrodynamic bearing 125 with cylindrical gap 63A controlled oil squeeze film could be retained circumferentially by a pin 73 axially positioned (or radially) with the seals 147 being replaced by controlled bearing end clearance relative to the housing 126 and seal 79 sides, incorporating a bearing/seal retention ring, seal ring 79 and spring washer. An oil film damping system in FIG. 19B is also considered in the radial gap 63A between the rotor spindle sleeve 54 and bearing 58. An oil squeeze film damping system is also depicted in the cylindrical/radial gap between housing 126 and #2 housing 140 with associated seals 130. Oil is supplied to the bearing 125 thru channel 149 and radial squeeze film damping system and also to the aft end of the bearing housing 126 area 140A to counter the resultant pressure thrust load of cavity 168. The oil drain from the bearing 125 exits axially both sides and thru channel 123. Circumferential hydrodynamic oil shear forces are developed between the shaft 122 and bearing 125 during operation where an O-ring 130 could be used to counter but as a safety margin and circumferential timing purposes lug 166 could be incorporated into housing 140 as noted in FIG. 12. A snap-ring 142 is radially tight fitted to the housing 126 and against lug 129 of bearing housing 126 with restricted circumferential movement to lug 166 relative to the snap ring open end. Also axial retention is between shoulder 140A of housing 140 and adjacent snap ring retainer 142. Oil drains away from the bearing 125 thru case holes 123 via gravity means. An air labyrinth seal 132 and seal O-rings 128 are mounted in bearing-seal housing 126 and retained axially via snap ring 148 with circumferential retained via the o-rings. The lab seal 132 limits compressor air duct 168 leakage into the bearing-seal housing 126. The radial holes 129A of seal 132 in FIG. 12 allow for air leakage to go overboard housing 126 connected and housing 140 channel 131 connect to allow overboard flow. In FIG. 5 both the lab seal 132 and bearing 125 with retainer 138 could be hard mounted to the housing 126 allowing oil squeeze film damper only between support 126 and 140 housing offering further simplicity. Axial thrust load from 168 compressor pressure would require a means to limit resistance at face flange 133.

Figure 17:
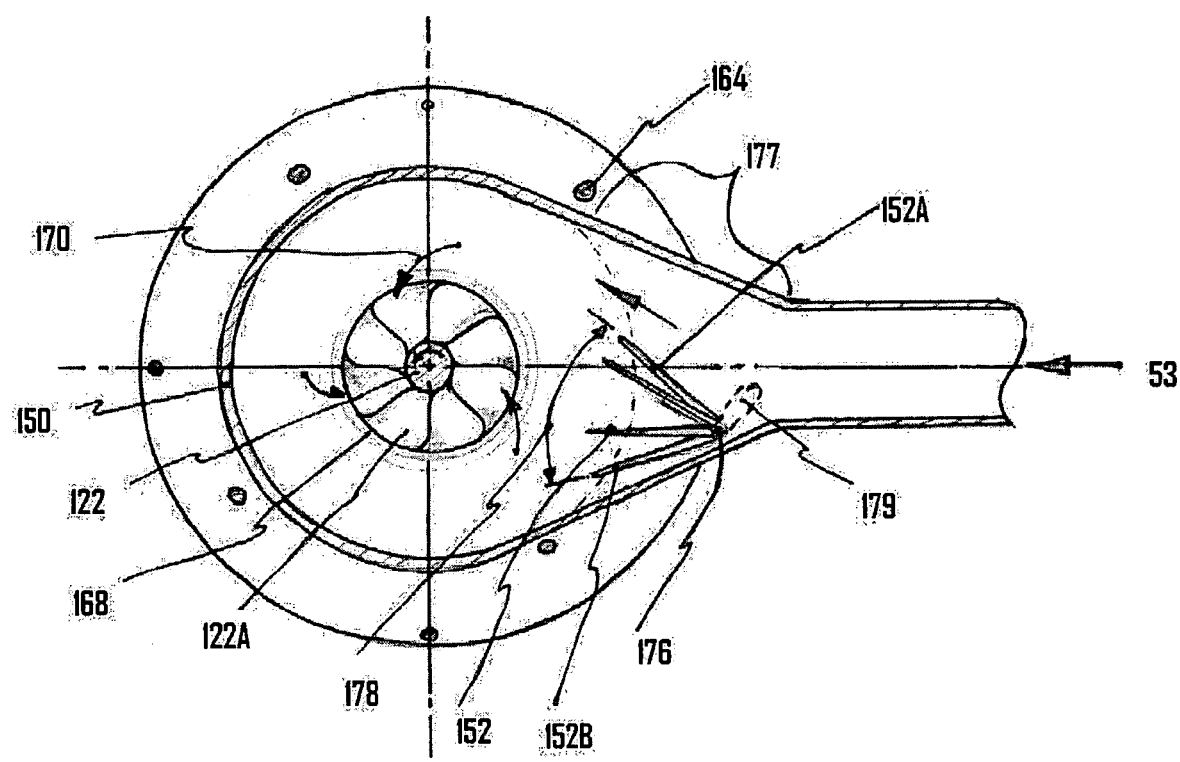
FIG. 17 is a front cross sectional view BB of FIG. 7, $2^{nd}$ compressor inlet preswirl with moveable vane/plate preferred embodiment of the present invention.
Figure 18:
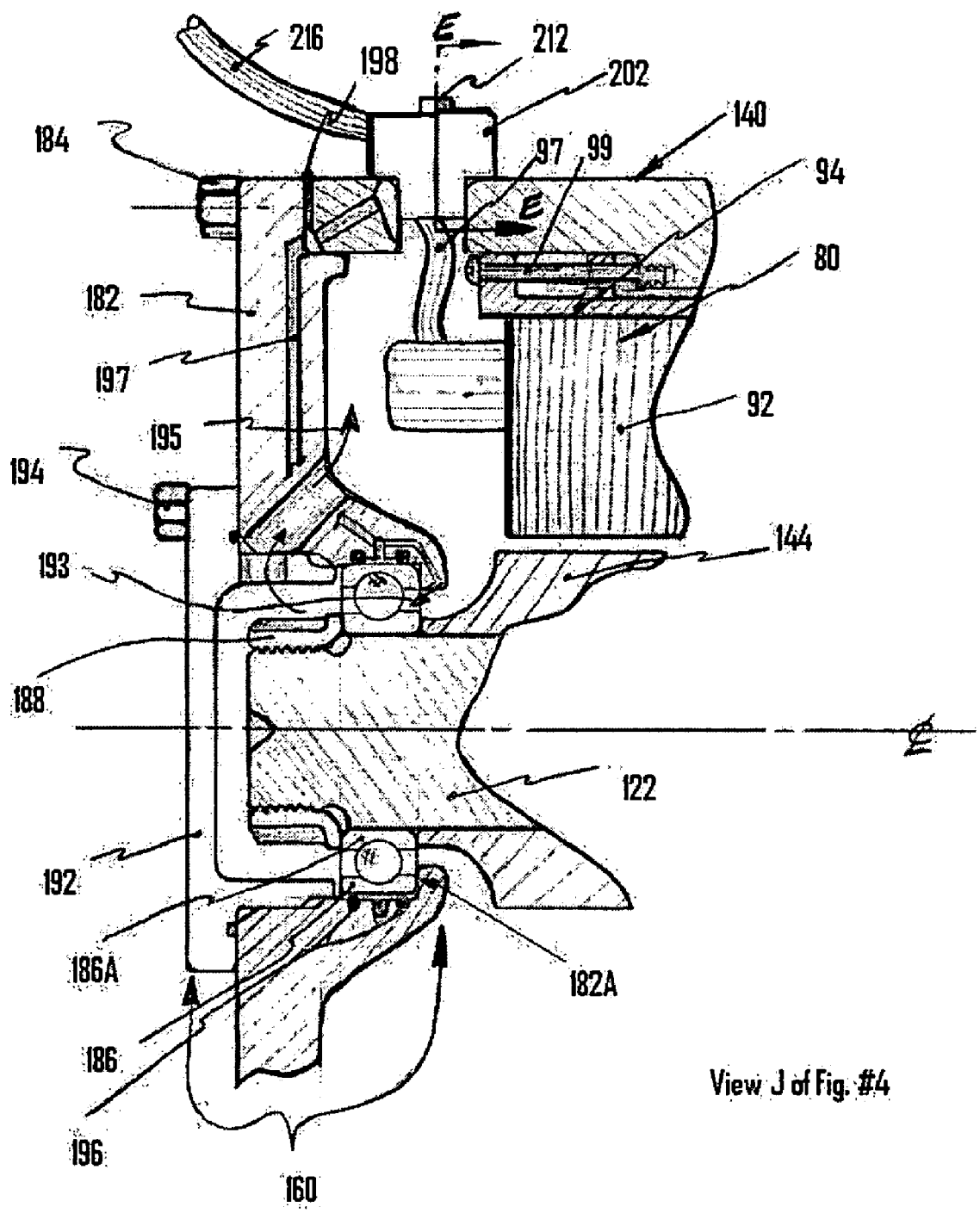
FIG. 18 is a side cross sectional view J of FIG. 4, $2^{nd}$ spool front bearing support of the present invention.

The $2^{nd}$ spool rotor bearing support assembly 160 of FIG. 18 retains the thrust bearing 186, positions the rotor shaft 122 of the #2 spool module 120 and incorporates oil squeeze damping between the bearing 186 outer race and support 182 having limited axial bearing movement and controlled by a defined bearing axial gap between the retainer 192 and shoulder 182A. Oil is supplied thru channel 197 to the bearing for damping with seals 196, also acting as anti-rotation means of the bearing outer race and delivered to the bearing via channel 193 and having gravity oil drain thru areas 195. The bearing 186 is retained to the rotor 122 of the #2 spool module 120 with nut 188. The alternator rotor 144 shoulders to the bearing inner race 186A. The bearing support assembly 160 is retained to the 2nd housing 140 using bolts 184. The bearing 186 and #2 spool module 120 are axially positioned thru shims 198. The #2 spool housing module 140A of FIG. 2 includes: an alternator stator module 80 for electrical power output having a cooling sleeve 94, stator wires 97, iron laminats 92, stator retention screws 99, and power output lugs 212 FIG. 13 within a lug/insulation assembly block 180, an air start housing cavity 156 of FIG. 4 with an air supply port 154 of FIG. 7 and to activate the starter, air from a storage system is directed thru port 154 into cavity 156 FIG. 1 and thru tangent nozzles 174 air is impinged onto compressor blades 122A of compressor 122 causing rotation reference FIG. 7, $2^{nd}$ compressor inlet duct section 150 accepts compressed air 53 from the $1^{st}$ spool module exit port 32 of FIG. 1 and delivers air 53 to the $2^{nd}$ compressor 122A and inlet 168 where air is further compressed and passes thru the diffuser 158 and onto the combustor 86A within combustor case 60. Fuel is delivered thru an injector port 164 to the combustor FIG. 1. There are associated controlled radial clearance between the spool rotor support 126 and the #2 housing 140 with seals 130 and bearing 125 of FIG. 12, 2 and 4 for rotor dynamic consideration. Pressurized air flow enters this housing 140 section duct 150 at port 53 and is then directed toward the $2^{nd}$ compressor inlet 122A with and induced preswirl 170 in rotor rotation direction. FIG. 17 shows a diffused section 177 having a vane/plate 152 and variable position arc capability 178 with non preswirl 152B and full preswirl position 152A and mechanical positioning arm 179 connected to pivot axis 176. The vane/plate position toward 152A would induce an inlet 168 preswirl 170 with rotation direction of rotor 122 compressor 122A or a reduced diffused flow velocity radially in from one side of the inlet 168 with vane position 152B. Also during reduced power/flow and with the engine $2^{nd}$ rotor spool 122 requirement of maximum RPM the plate can be positioned 152A to restrict the air flow. Other means of induced rotor 122 inlet preswirl could be thru a simple torous form of FIG. 11, a scroll volute depicted in FIG. 9, or inlet guide vanes 172 radially positioned and circumferentially spaced within supply duct 150 reference FIG. 10. The air start system could incorporate a pressurize CO2 means for a fluid tangent force to induce #2 spool rotation or channeled tangent pressurized fluid to the turbine wheel 122B. The J-5-1 turbojet in 1969 used an air start system which directed air to the turbine wheel and later in 1972 Williams incorporated similar approach but used an explosive gas onto the turbine wheel for the cruise missile engine application removing their need for gear box starter. The alternator stator module 80 of FIGS. 1, 2, 4, 18 and 13 has magnet wires 97 and iron core laminats 92 to provide electrical energy output from the relative rotational motion between the alternator 144 of the $2^{nd}$ rotor spool 120 and electrical stator module 80. A heat exchanger 94 using oil media is incorporated around the stator laminats to remove generated heat and is sealed at the oil exiting end of stator sleeve 94. The relative rotation of the rotor 144 (with permanent magnets restrained within) to the stator assembly 92 causes high AC voltage and high frequency to be developed for out power. The oil flow over the sleeve 94 heat-exchanger is not shown for simplicity, and oil cooling fluid is the preferred embodiment having commonality with the bearings. The stator could be air cooled instead of liquid fluid such as oil or glycol types.

The power terminal assembly 180 of FIGS. 1, 4, 18, and 13 incorporates sealed terminals 212 with seals 208 within a common electrical insulating block 202 to allow external power lead 216 attachment and retain to the $2^{nd}$ housing 140 and having the seal 208 and fastener 210. Depending on the electrical phase requirement the lead/wire lug quantity and stator wire 97 could be 1, 3, 6 or more. Terminal lug 212 is mechanically 208 screwed and soldered to the stator lead wire 97 and with any quantity of terminals depending on the stator phase requirement. The lug 212 has o-ring seal 208 at one end and retained within the terminal block 202. Round holes in the block receive the lugs 212 thru and adjacent to the outboard end of the block opening and a square area on the lug exists to communicate with the washer 204 which in turn fits to the square area of the terminal block 202 to resist the lug nut 206 installation torque. A lock washer 218 is incorporated along with the external wire retention nut 224. The block 202 retention fasteners 210 secure the block 202 to the housing 140 and oil seal 214. The thru hole in the block could be non-round to accept a square terminal lug 212 and resist nut retention torque installation forces and therefore not require the torque resistive design in the related preferred embodiment where a square washer 204 is incorporated.

The $1^{st}$ spool housing module 40A of reference FIGS. 1, 2, 3, 6, and 16 is the turbo charging stage of the invented hybrid microturbine. The $1^{st}$ spool module 40 a rotative device initiates the inlet air flow from atmosphere. The resultant increased air pressure of this first stage is delivered to the $2^{nd}$ spool inlet 168 via the exit port 32, and transition duct 150 of housing 140. The $2^{nd}$ spool compressor 122A exits air flow 89 communicates with the combustor 86A and combustor housing 60 and within the injected combustor fuel from injector 164 is mixed with air and ignited to create a continuous flame of hot energy gases delivered thru the $2^{nd}$ turbine nozzle 108 to the $2^{nd}$ turbine wheel 122B. The power developed in the $2^{nd}$ turbine 122B drives the $2^{nd}$ compressor 122A and the integrated alternator rotor 144 of $2^{nd}$ spool module 120. The relative rotation between the alternator rotor 144 and stator module 80 creates output electrical energy/power and exits thru the terminal block module 180 for external connection—usage. The hot gases 84 from the $2^{nd}$ turbine wheel 122B exit area are ducted 82/60 to the $1^{st}$ turbine bladed rotor 71 of $1^{st}$ rotor spool 42, $1^{st}$ spool module 40 thru the use of the turbine nozzle 88 of combustor housing 60 for a directed velocity (this could be separate).

A one piece cast housing could incorporate the $1^{st}$ spool housing 20 and $2^{nd}$ housing 140 and yielding generally $1^{st}$ rotor spool parallel to the $2^{nd}$ rotor spool. Also, air impingement starting could be incorporated similarly of the $2^{nd}$ spool start scheme into the $1^{st}$ spool housing module 40A as a separate engine start means or in tandem for an accelerated start means.

This hybrid microturbine invention having a $1^{st}$ and $2^{nd}$ rotor spool, one spool acts as a turbo charger and the $2^{nd}$ has an integrated alternator rotor and the $2^{nd}$ stage compressor with rotating blade in a housing coupled to a turbine to generate output electrical power thru relative alternator rotation coaxial and in close proximity to electrical stator wires and laminats. The inherent advantages over the piston internal combustion engine include: low emissions, increased durability, no vibration, high power to weight ratio, multifuel use, compact, lower weight and reduced maintenance. This turbine engine invention is started with an integral air impingement system/black start capability using stored engine air pressure or auxiliary means; applying the air pressure tangent to the #2 rotor spool compressor wheel exit area to cause rotation/initiate air flow with associated bearing oil flow and fuel flow delivery to the combustor/injector at approximately 10% of maximum operational rotor speed; simultaneously the air flow traveling to the $2^{nd}$ rotor spool thru the common ducting of the $2^{nd}$ housing and $1^{st}$ housing the air flow kinetics will cause the $1^{st}$ [rotor spool] to rotate within the $1^{st}$ spool housing module. Once the combustor is developing chemical fuel energy the $1^{st}$ spool thru the connected $1^{st}$ turbine and being exposed to this expanding gas energy will further cause acceleration to this $1^{st}$ rotor spool as a turbo charging stage. The main engine air intake is at the entrance of the $1^{st}$ spool housing and the increasing amount of air flow needed for the engine operation is related to the amount of energy available form the combustion process. The air start system together with the chemical energy from the supplied fuel will bring the $2^{nd}$ spool to a self sustaining speed of <40% of maximum speed at which point the air start flow will no longer be necessary. The combustor flame is continuous with higher fuel flow at higher power requirements. The rotor speeds will generally reduce with lower power needs and the maximum power will be limited by the turbine inlet temperature (TIT) of the #2 rotor spool thru a control monitor of the turbine exhaust gas. During normal engine operation air flow from the $1^{st}$ rotor spool compressor turbo charging stage is delivered to the $2^{nd}$ rotor spool compressor stage for increased pressure and temperature. Air and fuel are supplied to the combustor and with combustible mixture, hot gas flame energy is developed and referred to as chemical energy. The $2^{nd}$ turbine nozzle at the combustor exit directs the hot gases with increased velocity toward the blade turbine wheel creating power to drive the $2^{nd}$ spool compressor and alternator rotor. The alternator rotor relative rotation to the alternator stator module causes electrical power energy and output in thru the power terminal. The hot gases leaving the $2^{nd}$ spool rotor turbine exits into the combustor housing scroll section where the reduced temperature hot gases are directed to the #1 rotor spool blade turbine wheel to cause rotation and the power extraction drives the $1^{st}$ compressor bladed wheel. The hot gases with further reduced temperature thru the turbine wheel energy/power extraction exits the turbine wheel and combustor housing. The #1 spool rotational speed will vary based on power demand for the #2 spool, an aero thermodynamic product.

As to further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawing and described in the specification are intended to be encompassed by the present invention.

Therefore, the foregoing is considered as illustrative only of the principles of the invention. Further, since numerous modifications and change will readily occur to those skilled in the art, it is not desired to limit the invention to the exact construction and operation shown and described and accordingly all suitable modifications and equivalents may be resorted to, falling within the scope of the invention.

We claim:

1. A gas turbine engine for generating electricity, comprising: an engine body; a first rotor spool with an axis of rotation within said engine body, said first rotor spool having a first bladed compressor rotor with an air inlet and exit, a first compressor rotor shaft and a first bladed turbine rotor with a gas inlet and exit; a second rotor spool with an axis of rotation perpendicular to the first rotor spool axis of rotation within said engine body, said second rotor spool having an integral alternator rotor with retained permanent magnets, a second bladed compressor rotor having an air inlet and exit and a second bladed turbine rotor having a gas inlet and exit; an electrical stator within said engine body having electrical wire, laminates of magnetically attracted material, said stator is coaxial with and in close proximity to said alternator rotor where relative rotation to said stator inner diameter causes flux change and subsequent electricity generation within said wires; a combustion system within said engine body receives compressor discharge air from said second bladed compressor rotor exit for combusting supplied fuel and delivering combusted gas energy to the second bladed turbine rotor; an air intake in said engine body with communication to said first compressor inlet; the first turbine having a gas discharge duct within said engine body having fluid communication with said first turbine rotor exit; a first ducting means to deliver said first compressor rotor exit pressurized air flow to the inlet of said second compressor rotor inlet; a second ducting means to deliver said second turbine rotor exiting gas energy to said first turbine rotor inlet; wherein said first ducting means induces a preswirl to the second compressor rotor inlet by one of a scroll volute shaped duct or by providing an air flow control plate inside the duct.

* * * * *